United States Patent
Van Der Sijde et al.

(10) Patent No.: US 11,378,694 B2
(45) Date of Patent: Jul. 5, 2022

(54) METHOD OF OBTAINING A DIGITAL IMAGE

(71) Applicant: Lumileds LLC, San Jose, CA (US)

(72) Inventors: Arjen Van Der Sijde, Eindhoven (NL); Nicola Pfeffer, Eindhoven (NL)

(73) Assignee: Lumileds LLC, San Jose, CA (US)

(*) Notice: Subject to any disclaimer, the term of this patent is extended or adjusted under 35 U.S.C. 154(b) by 219 days.

(21) Appl. No.: 16/697,897

(22) Filed: Nov. 27, 2019

(65) Prior Publication Data
US 2020/0166646 A1    May 28, 2020

(30) Foreign Application Priority Data
Nov. 28, 2018  (EP) .................................... 18208930

(51) Int. Cl.
*H04N 5/232*  (2006.01)
*G01S 17/89*  (2020.01)
(Continued)

(52) U.S. Cl.
CPC .............. *G01S 17/89* (2013.01); *G01S 17/18* (2020.01); *H04N 5/2256* (2013.01);
(Continued)

(58) Field of Classification Search
CPC ................. G01S 17/18; G01S 17/89; G06T 2207/10016; G06T 2207/10024;
(Continued)

(56) References Cited

U.S. PATENT DOCUMENTS 6,061,091 A * 5/2000 Van de Poel ........... G06T 5/009
                                               348/241
9,819,849 B1* 11/2017 Rivard ................... H04N 5/357
(Continued)

FOREIGN PATENT DOCUMENTS

WO       2014/106843       7/2014
WO       WO-2020/108997 A1 6/2020

OTHER PUBLICATIONS

Yue Tao et al, "Deblur a blurred RGB image with a sharp NIR image through local linear mapping", 2014 IEEE International Conference on Multimedia and Expo (ICME), IEEE, Jul. 14, 2014 (Jul. 14, 2014), p. 1-6, XP032639208.
(Continued)

*Primary Examiner* — James T Boylan
(74) *Attorney, Agent, or Firm* — Schwegman Lundberg & Woessner, P.A.

(57) ABSTRACT

Devices, systems and methods are described. A method includes driving a first light source to generate a visible light pulse having a first intensity for a first duration to illuminate a scene. An image sensor is used to record a visible-spectrum image of the scene illuminated by the first light pulse. A second light source is driven to generate a second light pulse having a second intensity that exceeds the first intensity by at least 100% for a second duration that is at most 10% of the first duration to illuminate the scene during the first duration. An image sensor is used to record a monochrome image of the scene illuminated by the second light pulse. Image processing is performed on a visible-spectrum image and the monochrome image to obtain the digital image of the scene.

19 Claims, 4 Drawing Sheets

(51) Int. Cl.
  *H04N 13/254* (2018.01)
  *G01S 17/18* (2020.01)
  *H04N 5/225* (2006.01)
  *H04N 5/235* (2006.01)
  *H04N 5/33* (2006.01)
  *H04N 9/04* (2006.01)

(52) U.S. Cl.
  CPC ......... *H04N 5/2327* (2013.01); *H04N 5/2354* (2013.01); *H04N 5/332* (2013.01); *H04N 9/045* (2013.01); *H04N 13/254* (2018.05)

(58) Field of Classification Search
  CPC .......... G06T 2207/10048; G06T 2207/10144; G06T 2207/10152; G06T 2207/20201; G06T 2207/20221; G06T 5/003; G06T 5/50; H04N 13/254; H04N 5/2256; H04N 5/23254; H04N 5/2327; H04N 5/2354; H04N 5/332; H04N 9/045; H04N 9/04551
  See application file for complete search history.

(56) References Cited

U.S. PATENT DOCUMENTS

| | | | | |
|---|---|---|---|---|
| 9,992,472 | B1* | 6/2018 | Cutu | H04N 13/254 |
| 2015/0062347 | A1* | 3/2015 | Jin | H04N 9/0451 |
| | | | | 348/164 |
| 2016/0330374 | A1* | 11/2016 | Ilic | H04N 5/23222 |
| 2017/0286792 | A1* | 10/2017 | Ackerman | H04N 5/2329 |
| 2017/0347003 | A1* | 11/2017 | Shih | G06T 5/009 |
| 2020/0162719 | A1* | 5/2020 | Tadi | H04N 13/257 |

OTHER PUBLICATIONS

Yan Qiong et al, "Cross-Field Joint Image Restoration via Scale Map", Dec. 1, 2013 (Dec. 1, 2013), p. 1537-1544, XP032573142.
"European Application No. 18208930.0, extended Search Report dated May 21, 2019", 7 pgs.
"International Application Serial No. PCT/EP2019/081170, International Search Report dated Jan. 17, 2020", 4 pgs.
"International Application Serial No. PCT/EP2019/081170, Written Opinion dated Jan. 17, 2020", 6 pgs.
"European Application Serial No. 19798684.7, Response filed Oct. 22, 2021 to Communication pursuant to Rules 161(1) and 162 EPC", 5 pgs.

* cited by examiner

METHOD OF OBTAINING A DIGITAL IMAGE

FIELD OF INVENTION

The invention describes a method of obtaining a digital image, an imaging arrangement, and a handheld device comprising such an imaging assembly.

BACKGROUND

Digital image sensor arrays have become very economical to manufacture, with the result that most cameras presently in use by consumers are digital cameras. It is usual to incorporate at least one digital camera in a mobile device such as a smartphone. A handheld device with digital imaging functionality can include an imaging assembly with an image sensor and a flash module with one or more light-emitting diodes (LEDs) to illuminate a scene. The sensitivity of present-day CMOS image sensors is such that favourably sharp images can be captured in daytime or well-lit conditions, and it is usual to combine such an image sensor with a flash module in an imaging arrangement.

A visible-spectrum LED of a flash module is generally based on an (Al)InGaN die in which the optical power is converted into broad-spectrum visible light by stacking appropriate phosphors on top of the die. Such an (Al)InGaN die can be powered up to current densities of 3.0-4.0 A/mm$^2$. When used as a flash in combination with a CMOS image sensor, it is possible to obtain satisfactory images as long as the subject is close enough to the camera and/or stationary.

To capture a sharp image in a dimly-lit scene, especially when people or objects are moving through the scene during the imaging sequence, the flash of a conventional digital camera would need to generate a higher power burst within a shorter time. The visible light used to generate a camera flash generally comes from a "white" (Al)InGaN LED, which actually comprises a blue LED and one or more phosphor layers for wavelength conversion. However, because of the Auger effect, it is generally not possible to further increase the power of a light pulse from such a white (Al)InGaN LED while decreasing the pulse time. This is because the Auger effect limits the photon generation and total optical power output of the blue LED. When the LED current is increased beyond a certain threshold, the light output may even decrease. As a result, the digital camera of a handheld device may be unable to capture a sharp image of a moving object in dim or poorly-lit conditions. Instead, the image can be blurred and unsatisfactory.

Therefore, it is an object of the invention to provide a way of improving the quality of images captured by such an imaging arrangement.

SUMMARY

The object of the invention is achieved by the method of claim 1 of obtaining a digital image of a scene, and by the imaging arrangement of claim 6. According to the invention, the method of obtaining a digital image of a scene comprises the steps of driving a first light source to generate a first light pulse to illuminate the scene, which first light pulse is a visible-spectrum light pulse extending over a first duration; operating an image sensor to record a visible-spectrum image of the scene illuminated by the first light pulse; driving a second light source to generate a second light pulse during the first light pulse to illuminate the scene, such that the duration of the second light pulse is at most 10% of the duration of the first light pulse, and such that the intensity of the second light pulse exceeds the intensity of the first light pulse by at least 100%; operating an image sensor to record a monochrome image of the scene illuminated by the second light pulse; and performing image processing steps on at least one such visible-spectrum image and at least one such monochrome image to obtain the digital image of the scene.

As mentioned above, most digital cameras are unable to capture good-quality images in darkness or poorly-lit conditions when elements of the scene (the region to be imaged) are in motion. An example may be a person moving through the scene, a person moving her head, gesticulating, etc. An advantage of the inventive method is that it makes it possible to obtain a better quality image in dim or poorly-lit conditions when a subject is in motion. The resulting image of the scene will have less blur, so that the scene is rendered to a higher level of sharpness. The inventive method achieves this by essentially capturing two kinds of image, namely one or more full-colour or visible-spectrum images, and one or more monochrome images. The visible-spectrum image is obtained in the usual manner by illuminating the scene using a pulse of visible light that covers the image sensor integration time or exposure time. The monochrome image is captured by illuminating the scene for a comparatively short duration using a pulse of high-intensity light. This second light pulse is generated during the visible-spectrum light pulse and its duration is significantly shorter than the visible-spectrum light pulse duration. The second light pulse essentially performs a "motion freeze" function and allows a relatively sharp monochrome image to be captured. At the same time, the "slower" visible-spectrum or RGB image is captured using the comparatively long visible-spectrum flash. The colour information from one or more long-pulse RGB images can be combined with the monochrome information from one or more short-pulse images to obtain a composite image in which motion blur will be significantly reduced or even eliminated. Known image processing techniques can be used to assign correct colour to any image regions associated with motion blur in the RGB image.

According to the invention, the imaging arrangement comprises a first light source for generating a first light pulse, which first light source comprises a visible-spectrum light source; a second light source for generating a second light pulse, which second light source comprises a visible-spectrum light source or an infrared-spectrum light source; a driver configured to drive the first light source to generate the first light pulse over a first duration, and to drive the second light source to generate the second light pulse over a second duration, which second duration is at most 10% of the duration of the first light pulse, and such that the intensity of the second light pulse exceeds the intensity of the first light pulse by at least 100%; an image sensor arranged to record a visible-spectrum image of a scene illuminated by the first light pulse; an image sensor arranged to record a monochrome image of the scene illuminated by the second light pulse; and an image processing unit realised to combine information from a visible-spectrum image and a monochrome image to obtain a digital image of the scene.

The invention also describes a mobile device that comprises an embodiment of the inventive imaging arrangement and is preferably realized as a handheld device, for example as a smartphone.

The dependent claims and the following description disclose particularly advantageous embodiments and features of the invention. Features of the embodiments may be combined as appropriate. Features described in the context of one claim category can apply equally to another claim category.

In the following, but without restricting the invention in any way, it may be assumed that an image sensor is a CMOS image sensor of the type widely used in consumer electronics devices. The inventive imaging arrangement may use one image sensor, or a combination of two image sensors, and will in each case be able to capture full-colour images of a scene as well as monochrome images, as will be explained below. For the purposes of discussion, it will be assumed that an imaging sequence is taking place in a dimly-lit environment, for example an outdoor scene at twilight or at night, or an indoor scene in a poorly-lit room. Under such conditions, the exposure time or integration time of a visible-spectrum image sensor is usually automatically extended to ensure a reasonable signal-to-noise ratio (SNR) in the image. However, a longer image sensor integration time will generally result in image blur if the subject is moving. The inventive imaging arrangement and method are proposed to overcome this problem.

The visible-spectrum light source can be realised in any suitable manner and may comprise one or more (Al)InGaN LED dies with suitable phosphor coatings to obtain a white light output as explained in the introduction. The emission wavelengths of the visible-spectrum light source are preferably matched to the colour filter array or colour filter mosaic of the image sensor.

The second light source can also be a visible-spectrum light source, but realised so that it can be over-driven for a very brief duration to obtain a short, high-intensity light pulse that can be used to obtain a "motion-freeze" image. In a particularly preferred embodiment of the invention, the second light source emits in the infrared range. Such an embodiment is based on the insight that an infrared semiconductor emitter, for example an (Al)GaAs emitter, can withstand high current densities without suffering a decrease in light output, especially at shorter pulse length. The inventive method preferably uses such a high-power infrared flash and an infrared-sensitive image sensor to record an "infrared monochrome" image of the scene. The term "infrared" as used herein may be assumed to refer to wavelengths in the near-infrared range, i.e. about 700 nm to 1000 nm. Any object that was in motion during the short infrared pulse will be captured favourably sharply in the infrared monochrome image. In the following, without restricting the invention in any way, it may be assumed that the second light source is such an infrared-spectrum light source. Preferably, such an infrared-spectrum light source comprises one or more suitable infrared-emitting semiconductor devices. In a particularly preferred embodiment of the invention, the infrared-spectrum light source comprises one or more infrared-emitting LEDs or vertical cavity surface-emitting laser (VCSEL) diodes.

A driver can activate the first light source to generate a pulse with a duration that is slightly longer than the image sensor integration time. In dimly-lit conditions, any moving subject in the scene may be significantly blurred in the resulting visible-light image. In the inventive method, an additional second light pulse is generated during the first light pulse, at a significantly higher intensity and for a significantly shorter duration. Since the infrared light source only needs to illuminate the scene briefly (to perform motion freeze), the duration of the infrared-spectrum light pulse is at most 10%, more preferably at most 2%, of the duration of the visible-spectrum light pulse, and therefore also only a corresponding fraction of the integration time of an image sensor.

For example, for an image sensor with an integration time of 100 ms, an RGB pulse generated by one or more white-light LEDs may persist for 200 ms, while a motion-freeze pulse generated by one or more infrared VCSELs may persist for only 5 ms, and the power of the motion-freeze pulse can exceed the power of the RGB pulse by a factor of two. In another example, the power of the motion-freeze pulse can exceed the power of the RGB pulse by a factor of four, and persist for an even shorter duration such as only 0.2 ms.

The visible-spectrum light pulse generated by the first light source may be referred to as the "RGB pulse", "white light flash" or "main flash" in the following, while the pulse of light emitted by the second light source can be referred to as the "monochrome flash" or "motion freeze flash". Since the second light source is preferably an infrared light source, this second light pulse may also be referred to as the "infrared flash" in the following.

In a preferred embodiment of the invention, the inventive imaging arrangement comprises only one image sensor, provided as a four-colour array. Such a single image sensor comprises sensor pixels that are sensitive in the visible-spectrum range and also sensor pixels that are sensitive in the infrared-spectrum range. This shall be understood to mean that the image sensor comprises an array of infrared-sensitive, red-sensitive, green-sensitive and blue-sensitive pixels. Generally, the ratio of green pixels to red or blue is about 2:1, i.e. there are generally about twice as many green-sensitive pixels than either red or blue pixels in the pixel array. Preferably, the infrared sensitive pixels comprise about 25% of the array total, and are arranged in a suitable distribution between the red, green and blue pixels. In such an embodiment, the image sensor is provided with a suitable filter arrangement, for example a colour filter array (also referred to as a Bayer filter mosaic or a colour filter mosaic) formed by depositing microscopically small filters onto the array of pixels.

In an alternative preferred embodiment of the invention, the imaging arrangement comprises a dedicated colour sensor ("RGB sensor") and a separate monochrome sensor ("infrared sensor"). The RGB sensor comprises only sensor pixels that are sensitive in the visible-spectrum range, and may include an RGB colour filter array as described above. The separate infrared sensor can comprise only sensor pixels that are sensitive in the infrared-spectrum range. For example, the infrared sensor may be a CMOS sensor (silicon based) of the type typically used in a night vision camera, a partially enhanced sensor, a dedicated IR-sensitive InGaAs sensor, etc. and may be provided with a filter that is at least partially transmissive to wavelengths in the infrared spectrum.

In a further preferred embodiment in which the imaging arrangement comprises two image sensors, for example in a device that also has a stereo imaging capability, each image sensor can be sensitive in the visible-spectrum range. To obtain an infrared image, one of the image sensors is provided with a suitable filter that also partially passes infrared wavelengths, for example a notch filter between visible and infrared wavelengths. By adding a notch filter between the visible and infrared wavelengths, the otherwise broader colour filter dependent spectrum is narrowed to exclude IR wavelengths that are not present in the illuminating pulse, so that correlation is made easier. This can be beneficial in the case where camera sensitivity would otherwise extend from the visible range into the infrared range, meaning for example that the red filter sensitivity range of both image sensors would be disproportionately broad. With such a notch filter, it is possible to specifically respond to IR wavelengths of the IR light source.

As explained above, an imaging sequence results in two types of image, i.e. one or more RGB images and one or more infrared images. An RGB image provides colour information for the scene, but will show motion blur for any subject that was in moving during the relatively long main flash. An infrared image provides a monochromatic but relatively sharp motion-freeze snapshot of the scene. Each image pixel of a colour image comprises a red component, a green component, and a blue component (collectively referred to as the RGB value of the pixel). To obtain a satisfactory image without motion blur, the inventive method combines the information provided in a colour image with information provided by a monochrome image. To this end, image brightness information is processed in a first step in which red, blue and green components can be combined to a "Y component" by a weighted sum of the three colours, resulting in a corrected "RGB-Y image". Then, on both the RGB image as well as the IR image, image processing is performed in a second step to detect areas of motion blur, for example by applying edge detection functions. In a third step, for any area of the RGB-Y image that contains motion blur, the Y information of an image pixel is "corrected" by the infrared value of a corresponding pixel in the infrared image. In a fourth step, pixel colour in the motion-blur regions of the RGB-Y image is then recreated.

The skilled person will be familiar with necessary image processing techniques such as colour subtraction and interpolation, and these steps need not be explained in detail here.

In a particularly preferred embodiment of the invention, an RGB image is obtained by combining or interpolating information from a sequence of RGB images. To this end, a sequence of RGB images is collected. For each RGB image, the scene is illuminated by a visible-spectrum light pulse. With this approach, various improvements are possible. For example, it is possible to obtain more accurate information regarding the correct background colours to use when reconstructing background regions from motion-blur regions. It is also possible to improve the reconstruction of any motion-blur regions in moving objects in the images. Having a sequence of RGB images allows selection of the least blurred image to use as a starting point for image optimisation. From the sequence of images, it is also possible to determine the trajectory of any moving object, and editing of the motion blur regions can be improved since the distribution of blur about the leading edge of a moving object is different from the distribution of blur about its trailing edge.

Of course, the inventive imaging arrangement can also be used during normal daylight or brightly lit conditions, in which case a controller may detect that lighting conditions are satisfactory, and may suppress generation of the infrared pulse and the image processing steps described above.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWING(S)

In the drawings, like numbers refer to like objects throughout. Objects in the diagrams are not necessarily drawn to scale.

DETAILED DESCRIPTION OF THE PREFERRED EMBODIMENT(S)

Figure 1:
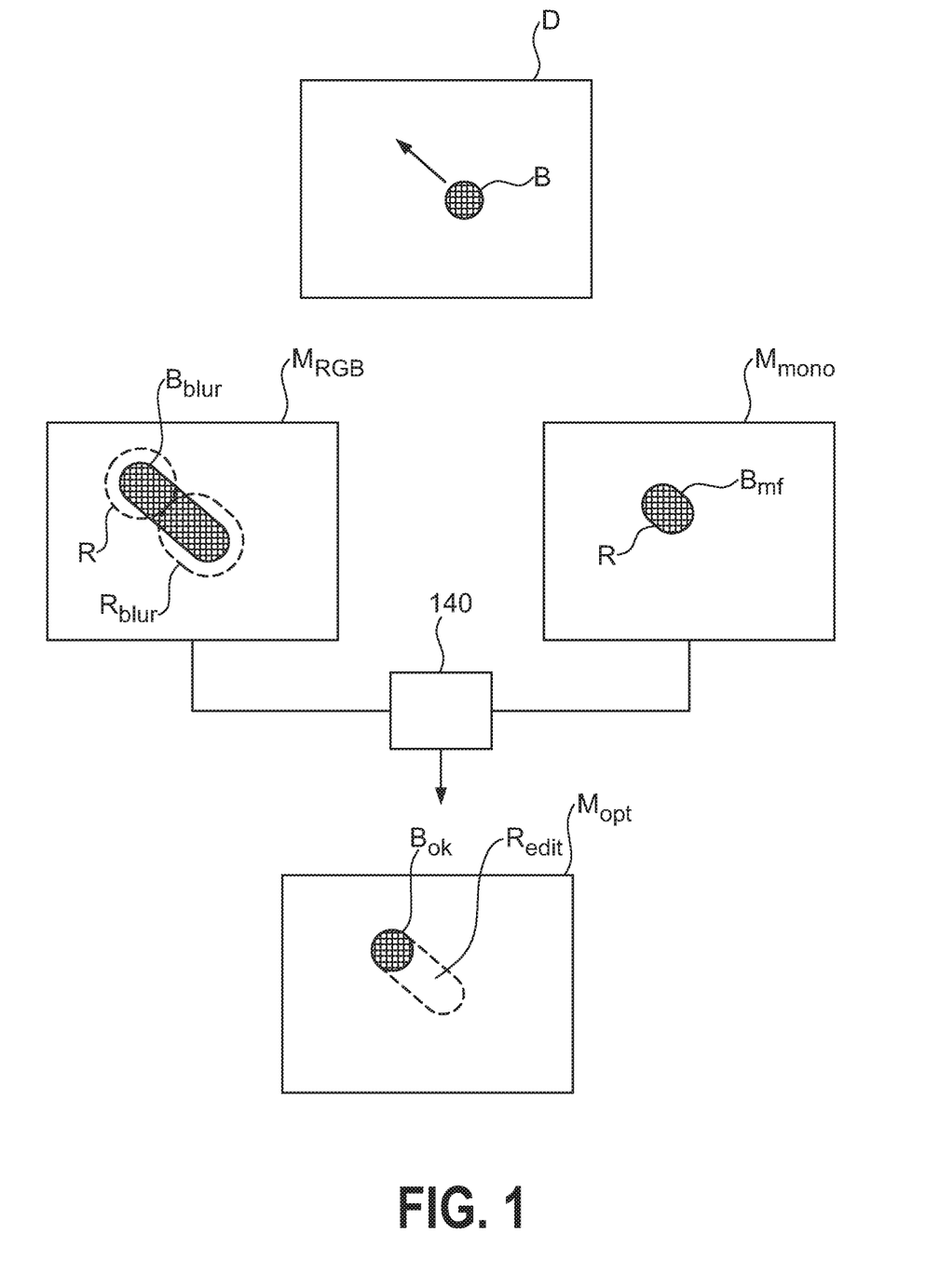
FIG. 1 is a simplified block diagram to illustrate the principle of the invention.

FIG. 1 is a simplified representation of a poorly-lit scene D with a moving subject B, and two images $M_{RGB}$, $M_{mono}$ obtained using the inventive method. A first image $M_{RGB}$ is a colour image $M_{RGB}$ obtained during the visible-spectrum light pulse. This colour image $M_{RGB}$ will record a blurred version $B_{blur}$ of the moving object B, since the RGB sensor and the visible-spectrum flash are realised to increase the integration time (exposure time) as necessary to obtain sufficient information. In the inventive method, a second, monochrome image $M_{mono}$ is obtained during the significantly shorter light pulse. This monochrome or "motion-freeze" image $M_{mono}$ is essentially a monochrome snapshot that is devoid of colour information but which is better at capturing the outline or shape of any moving objects. In this example, the body B moving through the scene D is captured as a comparatively sharp shape $B_{mf}$ in the infrared image $M_{mono}$.

The second light source could be realised as a visible-spectrum LED that can be overdriven over a brief period, i.e. to provide a high-intensity light pulse over a very short time. However, in this exemplary embodiment, it may be assumed that the second light source 12 is an infrared-emitting light source, and that the "monochrome" light pulse comprises wavelengths in the infrared range.

In an image processing step 140, the RGB values of the image pixels of the colour image $M_{RGB}$ are adjusted by a suitable luminance factor to improve the image signal-to-noise ratio. The algorithm comprises several main steps including the identification of blurred objects $B_{blur}$ in the colour image (only one exemplary blurred object is shown for the sake of clarity) using information from the monochrome image $M_{mono}$, performing brightness correction over the pixels in that image region $B_{blur}$, and performing colour adjustment in any corrected image region.

An initial step may be to consider the brightness of the image. Each image pixel X has a red ($R_X$), a green ($G_X$) and a blue ($B_X$) value. In one approach, a "brightness image" may simply comprise the $G_X$ values of the pixels of the RGB image. Alternatively, the red, green and blue colour values of each image pixel X of the colour image $M_{RGB}$ can be adjusted as follows $$R_X \rightarrow R_X - Y_X \qquad (1)$$

$$G_X \rightarrow Y_X \qquad (2)$$

$$B_X \rightarrow B_X - Y_X \qquad (3)$$

where $Y_X$ is a "grey value" of luminance for that pixel and is computed using the equation:

$$Y_X = 0.2R_X + 0.7G_X + 0.1B_X \qquad (4)$$

The result of this adjustment on each image pixel is a monochrome corrected brightness image (also referred to as "RGB-Y image" or "G image") described above. These adjustments can be beneficial especially in the case of an embodiment using only a single image sensor with an IR notch filter. In such an embodiment, the red, green and blue sensor pixels will also—to a small extent—integrate the infrared light arriving at the sensor. For colour reproduction, the red, green and blue components can be corrected using information from the IR image. In the above equations (1) and (3), such correction is performed by subtracting the IR signal.

The brightness image and the IR image are then analysed using pattern recognition or edge detection techniques. Where an edge is identified in the brightness image as well as the IR image $M_{mono}$, no correction is needed in the corresponding region of the RGB image $M_{RGB}$. Where an edge is blurred in the brightness image but sharp in the IR image $M_{mono}$, the RGB image $M_{RGB}$ will be corrected using information from the IR image $M_{mono}$. The grey value Y of equation (2) is therefore further adjusted for each pixel as follows $$Y'_X = \alpha \cdot Y_X + (1-\alpha) \cdot \beta \cdot IR_X \qquad (5)$$

where $\alpha$ is a pixel-dependent matching parameter, $\delta$ is a secondary matching factor to correct for the different reflectance of infrared light compared to visible light, and $IR_X$ is the appropriate pixel value in the motion-freeze image $M_{mono}$. The matching parameter $\alpha$ will be 1.0 for a non-blurred regions of the image and can be as low as 0.0 in a motion-blur region. In an alternative approach, the matching parameter $\alpha$ could be varied between 0.5 and 0.0 to use the IR information for the complete image, if e.g. noise conditions make this preferable.

For colour reconstruction, information from the RGB image $M_{RGB}$ will remain unchanged for any non-blurred image regions, i.e. $\alpha=1.0$ for each pixel in a non-blurred region (see equations (6)-(8) below). For motion-blur regions $B_{blur}$, several image processing techniques can be applied. For example, the difference in size of a moving object as recorded in the RGB image $M_{RGB}$ compared to its size in the IR image $M_{mono}$ will give an indication of the speed and direction of the movement and thereby give an indication of the "mixing ratio" between moving object B and background. For an object B moving across the scene D, the colour in a motion blur region $B_{blur}$ is essentially a blend of object colour and background colour, and more background is "mixed in" when the object B is moving quickly. Similarly, if the object B is moving towards the camera, the flash light will become more relevant and will highlight the object colour more than the background colour. The colour of any pixel X in blurred area of the image can be reconstructed from RGB values $R_{BG}, G_{BG}, B_{BG}$ of neighbouring background pixels (i.e. background pixels that are adjacent to the blurred image region), and image regions of the moving object B can be assigned the colour of the blurred region, corrected—for the mixing in of a suitable background colour. For the image pixels of the blurred object $B_{blur}$, colour is preferably reconstructed within regions corresponding to the moving object B identified in the "common" region R, as well as in regions $R_{blur}$ that actually belong to the background.

Motion towards or away from the camera can be identified by observing size and brightness changes over the object's trajectory or path, for example its brightness will increase if it is moving towards the camera. Object recognition can also be performed to assist in assigning a realistic colour to any corrected image region.

Within the object, i.e. within edges of the shape $B_{mf}$ detected in the IR motion freeze image $M_{mono}$:

$$R'_X \rightarrow \alpha R_X + (1-\alpha)(R_X - \gamma R_{BG}) \qquad (6)$$

$$G'_X \rightarrow \alpha G_X + (1-\alpha)(G_X - \gamma G_{BG}) \qquad (7)$$

$$B'_X \rightarrow \alpha B_X + (1-\alpha)(B_X - \gamma B_{BG}) \qquad (8)$$

The term $\gamma$ expresses the above-mentioned mixing ratio between the moving object and the background. In any blurred region of the image that is outside of the object, such interpolated/extrapolated RGB values can also be used to reconstruct the background colour. The background color for a pixel in a motion blur region $R_{blur}$ (and to the side of the object) can be assumed to be the same as the colour of an adjacent pixel outside the motion blur region $R_{blur}$. This simple assumption may suffice, or processing steps may be included to adjust such pixel colours to take into account any variations in the background. A resulting pixel value of the optimized image $M_{opt}$ is the set of equations (6)-(8).

The optimized image $M_{opt}$ will therefore show the object Box to a satisfactory degree of sharpness and colour, and will include image regions $R_{edit}$ (derived from motion blur $R_{blur}$ regions as shown in colour image $M_{RGB}$) that have been "edited" or corrected, for example to reconstruct the background.

An alternative approach to optimising the background is to combine information from images taken before or after the actual photo event carried out by the user. Such techniques are already used in smartphones to improve image quality.

In general, the form of the imaged object may be slightly elongated in the motion-freeze image, so that the shape of the object in the final image $M_{opt}$ may also be slightly elongated. Additional processing steps may be applied on an image sequence, if desired, to determine the object trajectory and speed from which the object's "real" shape may be deduced.

In a prior art imaging arrangement which uses an RGB sensor and a visible-spectrum flash $F_{RGB}$ that are optimised for imaging well-lit scenes, a moving object in a dimly-lit scene will result in a poor-quality image such as colour image $M_{RGB}$, in which a moving object B is imaged as a distorted and blurred shape $B_{blur}$.

Figure 2:
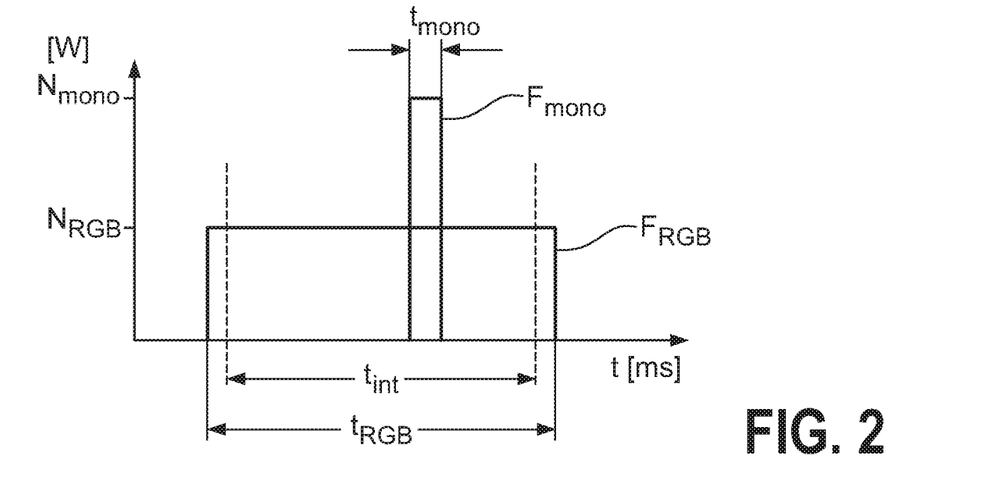
FIG. 2 shows a main flash and a motion-freeze flash generated during the inventive method.

FIG. 2 is a graph of optical power (Y-axis, in [W]) against time (X-axis, in milliseconds) for a main flash $F_{RGB}$ and a motion-freeze flash $F_{mono}$ generated in an imaging sequence using an embodiment of the inventive imaging arrangement, and used to capture the images $M_{RGB}, M_{mono}$ described in FIG. 1. The main flash $F_{RGB}$ extends in this exemplary embodiment over a relatively long duration $t_{RGB}$, over at least the relevant image sensor integration time $t_{int}$, so that the image sensor can record the incoming light to generate a digital image. The motion-freeze flash $F_{mono}$ is only generated for a very short time $t_{mono}$, but has a significantly higher optical power. In practice, the integration time $t_{int}$ may be shorter than the flash duration $t_{RGB}$. In a rolling shutter application, the duration $t_{RGB}$ may be twice the frame length (not necessarily the same as the sensor integration time).

Figure 3:
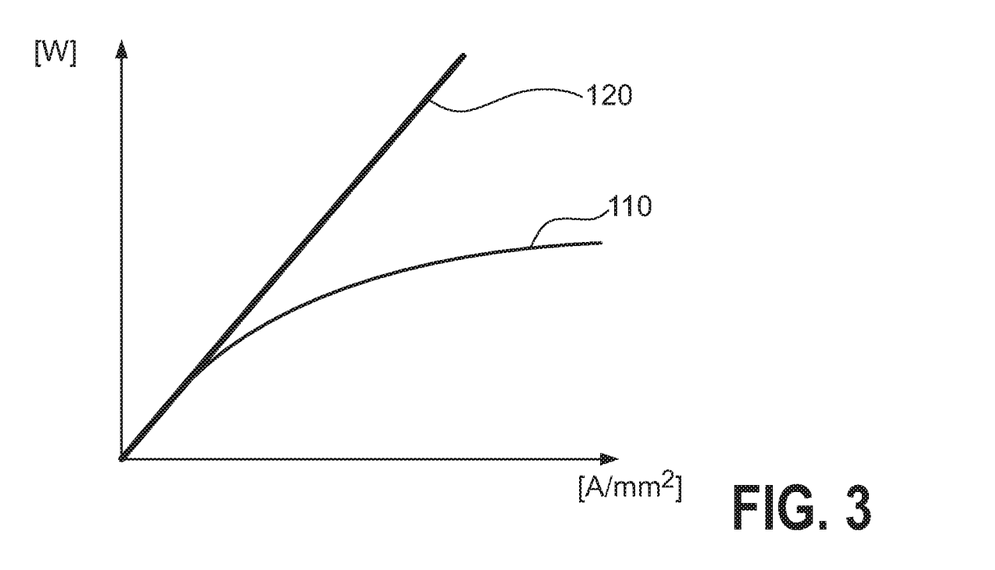
FIG. 3 shows exemplary curves of intensity vs. current density for a visible-spectrum semiconductor light source and an infrared-emitting semiconductor light source.

FIG. 3 is a graph of optical power (Y-axis, in [W]) against current density (X-axis, in [A/mm$^2$]) for a visible-spectrum semiconductor light source (curve 110) and an infrared-emitting semiconductor light source (curve 120). The diagram shows that the light output of a blue LED (acting as pump for a visible light LED device) saturates at high current densities, i.e. the light output cannot increase beyond a certain upper limit. In contrast, the light output of the infrared-emitting semiconductor light source saturates at much higher current densities. This makes it possible to generate the significantly higher motion-freeze flash of FIG. 2.

Figure 4:
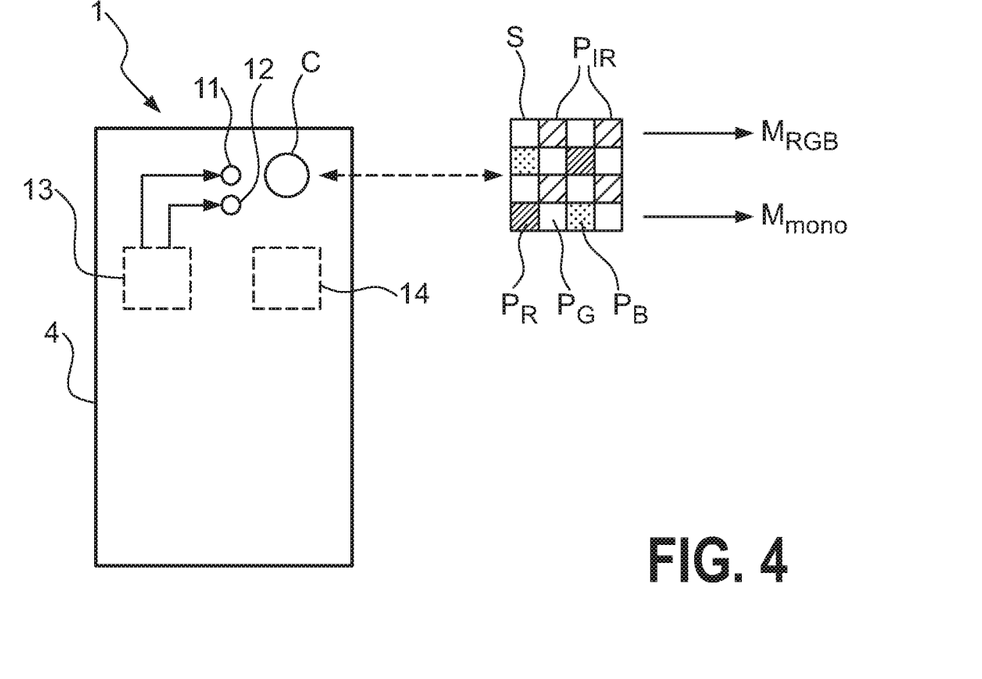
FIG. 4 shows an embodiment of the inventive imaging arrangement.

FIG. 4 shows an embodiment of the inventive imaging arrangement 1, incorporated in a smartphone 4. Here, the imaging arrangement 1 comprises a single camera C and therefore also a single image sensor S. The sensor S is represented in a simplified manner by its exemplary arrangement of sensor pixels $P_R$, $P_G$, $P_B$, $P_{IR}$ as indicated at the side of the diagram. In this embodiment, the image sensor S is a four-channel sensor, comprising red-sensitive sensor pixels $P_R$, green-sensitive sensor pixels $P_G$, blue-sensitive sensor pixels $P_B$, and also infrared-sensitive sensor pixels $P_{IR}$. Here, green-sensitive sensor pixels comprise about 50% of the total, infrared-sensitive sensor pixels comprise about 25% of the total; while red-sensitive and blue-sensitive sensor pixels each comprise about 12.5%.

The image sensor is equipped with a filter, for example by depositing a four-channel colour filter mosaic on the pixels of the image sensor die. The IR filter for pixels that are to respond to IR wavelengths may be formed by depositing red, green and blue filter layers onto those pixels $P_{IR}$.

The smartphone 4 also comprises a white LED light source 11 and an infrared light source 12. To capture a colour image $M_{RGB}$, a driver 13 causes the white LED light source 11 to generate a visible-spectrum light pulse $F_{RGB}$ (the main flash) as explained in FIG. 2. During the sensor integration time, visible light reflected from a scene arrives at the sensor S and reaches the RGB sensor pixels $P_R$, $P_G$, $P_B$. The infrared-sensitive sensor pixels $P_{IR}$ will be unaffected by the visible light reflected from the scene.

To capture a motion-freeze image $M_{mono}$, the driver 13 causes the infrared light source 12 to generate an infrared-spectrum light pulse $F_{mono}$ (the motion-freeze flash) as explained in FIG. 2. The infrared light reflected from a scene arrives at the sensor S and reaches the infrared-sensitive sensor pixels $P_{IR}$. Because the RGB sensor pixels $P_R$, $P_G$, $P_B$ will also detect infrared light, this can be corrected for by taking the difference between the RGB signal and the IR signal.

The colour image $M_{RGB}$ and the motion-freeze image $M_{mono}$ are then forwarded to an image processing unit 14 which will use the information provided by the images $M_{RGB}$, $M_{mono}$ to obtain the optimized image $M_{opt}$ described in FIG. 1, i.e. an image that is free of motion blur, or at least with reduced motion blur.

Figure 5:
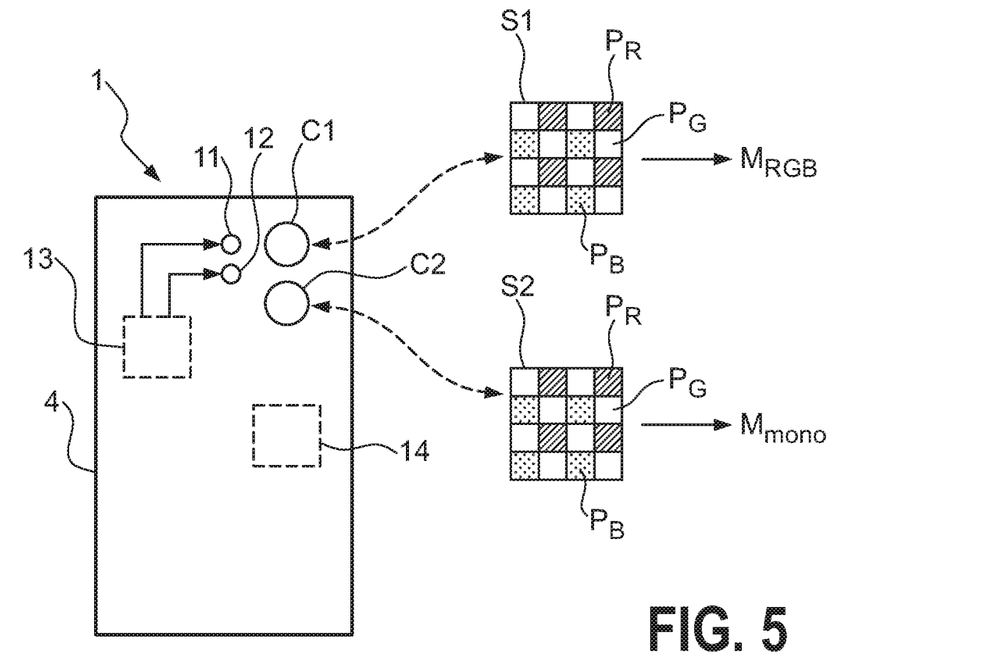
FIG. 5 shows a different embodiment of the inventive imaging arrangement.

FIG. 5 shows another embodiment of the inventive imaging arrangement 1, again incorporated in a smartphone 4. Here, the imaging arrangement 1 comprises two cameras C1, C2 and therefore also two image sensors S1, S2. As described in FIG. 4, the smartphone 4 also comprises a white LED light source 11 and an infrared light source 12. Here also, each sensor S1, S2 is represented in a simplified manner by its exemplary arrangement of sensor pixels $P_R$, $P_G$, $P_B$ as indicated at the side of the diagram. In this embodiment, each image sensor S1, S2 is a three-channel sensor, comprising red-sensitive sensor pixels $P_R$, green-sensitive sensor pixels $P_G$, and blue-sensitive sensor pixels $P_B$. Here, green-sensitive sensor pixels comprise about 50% of the total, while red-sensitive and blue-sensitive sensor pixels each comprise about 25%. An exemplary arrangement of sensor pixels of the image sensors S1, S2 is shown in the enlarged portion of the diagram.

One image sensor S1 is used to capture a colour image, and the other image sensor S2 is used to capture a monochrome infrared image. To this end, the first image sensor S1 is equipped with a colour filter mosaic applied to the image sensor die so that each sensor pixel is covered by a corresponding R, G, B filter as appropriate. The second image sensor S2 is equipped with a filter that is partially transmissive in the infrared region (so that its transmission spectrum overlaps with the emission spectrum of the infrared-spectrum light pulse $F_{mono}$). In this way, the sensor pixels of the second image sensor will record an infrared image. Because the second image sensor S2 is also sensitive to visible light, its integration time is reduced or shortened to allow the short motion-freeze exposure with the IR spectrum light pulse $F_{mono}$.

As described in FIG. 4 above, the driver 13 drives the light sources 11, 12 to generate a visible-spectrum light pulse $F_{RGB}$ (the main flash) over the integration time of the first sensor S1, and to generate an infrared-spectrum light pulse $F_{mono}$ (the motion-freeze flash) over the much shorter integration time of the second sensor S2. The first image sensor S1 provides the colour image $M_{RGB}$, and the second image sensor S2 provides the motion-freeze monochrome or infrared image $M_{mono}$. The images $M_{RGB}$, $M_{mono}$ are then forwarded to an image processing unit 14 which will use the information provided by the images $M_{RGB}$, $M_{mono}$ to obtain the optimized image $M_{opt}$ described in FIG. 1, i.e. an image that is free of motion blur, or at least with reduced motion blur.

Figure 6:
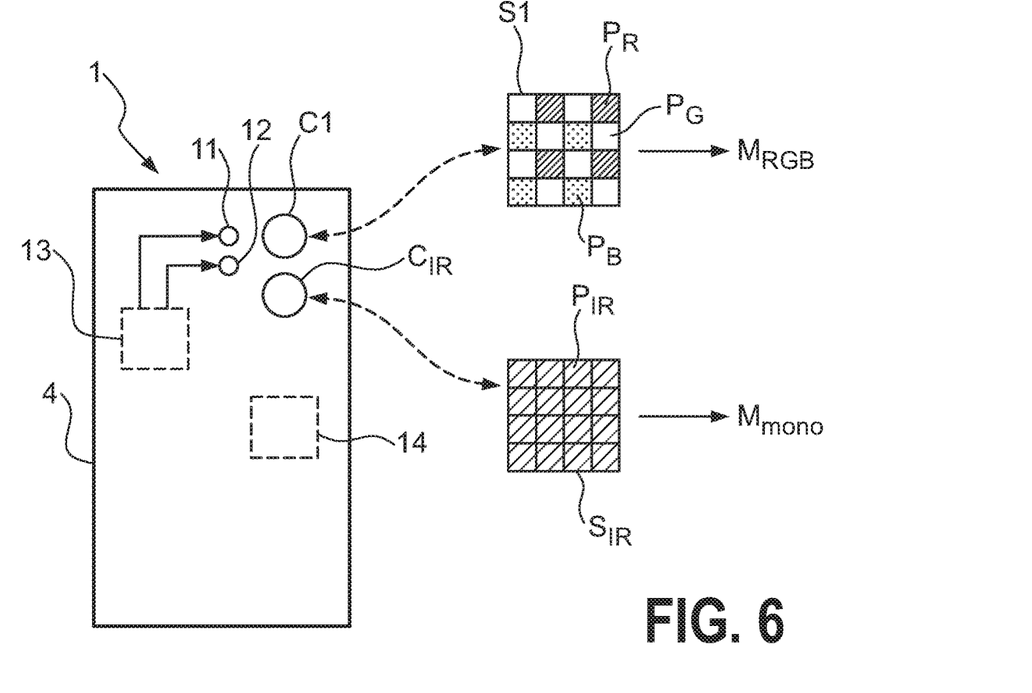
FIG. 6 shows a different embodiment of the inventive imaging arrangement.

FIG. 6 shows another embodiment of the inventive imaging arrangement 1, again incorporated in a smartphone 4. Here, the imaging arrangement 1 comprises a visible-spectrum camera C1 and an infrared camera $C_{IR}$, and therefore also two image sensors S1, $S_{IR}$. Here also, each sensor S1, $S_{IR}$ is represented in a simplified manner by its exemplary arrangement of sensor pixels $P_R$, $P_G$, $P_B$, $P_{IR}$ as indicated at the side of the diagram. Similar to the two embodiments described above, the device 4 also comprises a white LED light source 11 and an infrared light source 12. In this embodiment, the first image sensor S1 is a three-channel sensor, comprising red-sensitive sensor pixels $P_R$, green-sensitive sensor pixels $P_G$, and blue-sensitive sensor pixels $P_B$. Here, green-sensitive sensor pixels comprise about 50% of the total, while red-sensitive and blue-sensitive sensor pixels each comprise about 25%. The second image sensor $S_{IR}$ is an infrared image sensor, comprising only infrared-sensitive sensor pixels $P_{IR}$. An exemplary arrangement of sensor pixels of the image sensors S1, $S_{IR}$ is shown in the enlarged portion of the diagram.

The first image sensor S1 is used to capture a colour image $M_{RGB}$, and the infrared image sensor $S_{IR}$ is used to capture a monochrome infrared image $M_{mono}$. To this end, the first image sensor S1 is equipped with a colour filter mosaic applied to the image sensor die so that each sensor pixel is covered by a corresponding R, G, B filter as appropriate. The infrared image sensor $S_{IR}$ is equipped with a filter that is only transmissive in the infrared region. In this way, the sensor pixels of the infrared image sensor will record an infrared image $M_{mono}$.

As described in FIG. 4 and FIG. 5 above, the driver 13 drives the light sources 11, 12 to generate a visible-spectrum light pulse $F_{RGB}$ (the main flash) over the integration time of the first sensor S1, and to generate a short and powerful infrared-spectrum light pulse $F_{mono}$ (the motion-freeze flash) during the visible-spectrum light pulse $F_{RGB}$. The first image sensor S1 provides the colour image $M_{RGB}$, and the infrared image sensor $S_{IR}$ provides the motion-freeze monochrome or infrared image $M_{mono}$. The images $M_{RGB}$, $M_{mono}$ are then forwarded to an image processing unit 14 which will use the information provided by the images $M_{RGB}$, $M_{mono}$ to obtain the optimized image $M_{opt}$ described in FIG. 1, i.e. an image that is free of motion blur, or at least with reduced motion blur.

Figure 7:
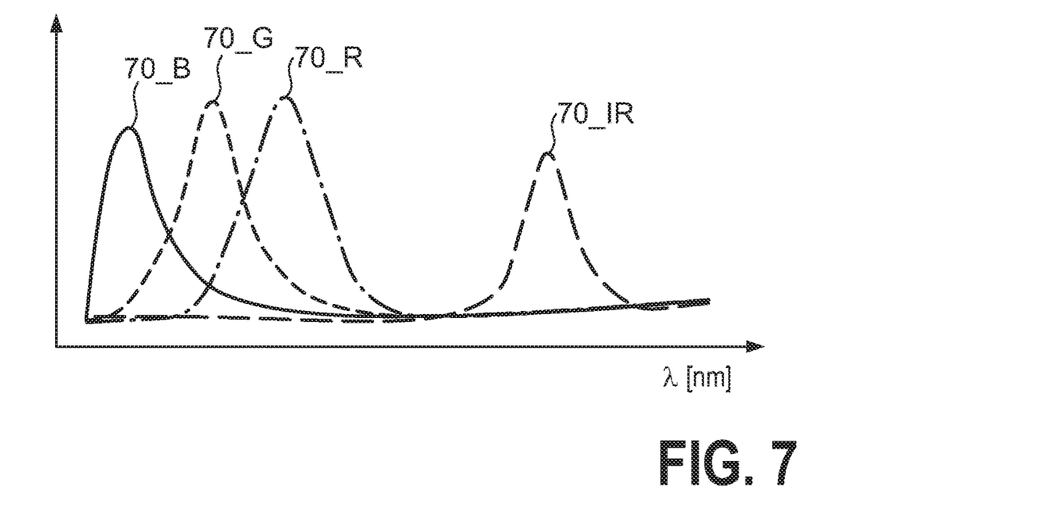
FIG. 7 shows an exemplary set of sensitivity peaks vs. wavelength.

The performance of the imaging arrangement 1 can be optimized by matching the light source spectra to the sensitivities of the image sensors. FIG. 7 shows an exemplary set of spectra 70_B, 70_G, 70_R, 70_IR, with amplitude plotted against wavelength λ [nm]. Preferably, the peak sensitivity of an image sensor pixel coincides with a peak spectrum amplitude of the relevant light source. For example, the peak sensitivity of a IR-sensitive sensor pixel $P_{IR}$ in an image sensor will be as close as possible to the peak amplitude of the IR part of the spectrum 70_IR generated by the IR light source 12.

Although the present invention has been disclosed in the form of preferred embodiments and variations thereon, it will be understood that numerous additional modifications and variations could be made thereto without departing from the scope of the invention. For example, the distribution of RGB and IR image sensor pixels could be different than shown in FIGS. 4-6 above; multiple monochrome images can be captured in the manner of a stroboscope; a moving object can be tracked by an infrared "follow-me" light to improve illumination of the moving object (for example using a segmented IR LED die); an active cooling step could precede an IR flash pulse in the case of temperature-limited IR LED driving conditions, etc.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS imaging arrangement 1
visible-spectrum light source 11
infrared-spectrum light source 12
intensity graph 110, 120
driver 13
image processor 14
image processing step 140
device 4
sensitivity curve 70_R, 70_G, 70_B, 70_IR
visible-spectrum image $M_{RGB}$
infrared-spectrum image $M_{mono}$
digital image $M_{opt}$
camera C, C1, C2, $C_{IR}$
image sensor S, S1, S2, $S_{IR}$
RGB sensor pixels $P_R$, $P_G$, $P_B$
infrared sensor pixel $P_{IR}$
scene D
moving object X
blurred imaged object $B_{blur}$
motion-freeze imaged object $B_{mf}$
imaged object $B_{OK}$
common image region R
motion blur region $R_{blur}$
corrected image regions $R_{edit}$
matching parameter α
visible-spectrum light pulse $F_{RGB}$
infrared-spectrum light pulse $F_{mono}$
pulse duration $t_{RGB}$, $t_{mono}$
sensor integration time $t_{int}$

What is claimed is:

1. A method of obtaining a digital image of a scene, the method comprising:
   driving a first light source using a first drive current having a first current density of about 1.0 A/mm2 to generate a visible light pulse having a first intensity for a first duration to illuminate the scene, the first duration being at least a sensor integration time;
   using an image sensor to record a visible-spectrum image of the scene illuminated by the first light pulse;
   driving a second light source using a second drive current having a second current density of more than about 1.5 A/mm2 to generate a second light pulse having a second intensity that exceeds the first intensity by at least about 100% for a second duration that is at most about 10% of the first duration to illuminate the scene during the first duration, the second duration being at most about 5.0 ms;
   using an image sensor to record a monochrome image of the scene illuminated by the second light pulse, the image sensor used to record the monochrome image being the same or different than the image sensor used to record the visible-spectrum image; and
   performing image processing on the visible-spectrum image and the monochrome image to obtain the digital image of the scene.

2. The method according to claim 1, wherein the image processing is performed on a sequence of visible-spectrum images and monochrome images recorded with respective light pulses.

3. The method according to claim 1, wherein the image processing comprises identifying a common image region corresponding to an imaged subject present in the visible-spectrum image and the monochrome image.

4. The method according to claim 1, further comprising identifying a motion blur image region in the visible-spectrum image.

5. The method according to claim 4, further comprising correcting color values in at least the motion blur image region.

6. A system comprising:
   a visible-spectrum light source configured to emit visible-spectrum light in a visible spectrum;
   a second light source that is configured to emit at least one type of light selected from the visible-spectrum light in the visible-spectrum and infrared-spectrum light in an infrared-spectrum;
   a driver configured to provide a first drive current having a first current density of about 1.0 A/mm2 to a first light source to generate a first light pulse having a first light intensity over a first duration and to provide a second drive current having a second current density of more than about 1.5 A/mm2 to the second light source to generate a second light pulse having a second light intensity that exceeds the first light intensity by at least about 100% over a second duration that is at most about 10% of the first duration, the first light pulse being a visible-spectrum light pulse, the first duration being at least a sensor integration time, the second duration being at most about 5.0 MS;
   at least one image sensor having pixels that are sensitive to at least the visible-spectrum light; and an image processing unit configured to combine information from a visible-spectrum image and a monochrome image to obtain a digital image of a scene.

7. The system according to claim 6, wherein the second light source comprises one or more light-emitting diodes configured to emit the infrared-spectrum light.

8. The system according to claim 6, wherein the second light source comprises one or more vertical cavity surface-emitting laser diodes.

9. The system according to claim 6, wherein the at least one image sensor comprises a single image sensor that comprises pixels that are sensitive to the visible-spectrum and pixels that are sensitive to the infrared-spectrum.

10. The system according to claim 9, wherein the single image sensor further comprises a filter that is at least partially transmissive to the infrared-spectrum.

11. The system according to claim 6, wherein the at least one image sensor comprises two image sensors, each comprising only pixels that are sensitive to the visible-spectrum.

12. The system according to claim 6, wherein the at least one image sensor comprises two image sensors, and a first one of the two image sensors comprises pixels that are sensitive to the visible-spectrum, and a second one of the two image sensors comprises pixels that are sensitive to the infrared-spectrum.

13. The system according to claim 12, wherein the first one of the two image sensors comprises a filter that is transmissive only in the visible-spectrum, and the second one of the two image sensors comprises a filter that is transmissive only in the infrared-spectrum.

14. The system according to claim 6, wherein the sensor integration time is approximately 50 ms.

15. The system according to claim 6, wherein the second duration is at most about 1.0 ms.

16. A wireless device comprising:
a camera flash comprising:
a visible-spectrum light source configured to emit visible-spectrum light in a visible spectrum,
a second light source that is configured to emit at least one type of light selected from the visible-spectrum light in the visible-spectrum and infrared-spectrum light in an infrared-spectrum, and
a driver configured to provide a first drive current having a first current density of about 1.0 A/mm2 to a first light source to generate a first light pulse having a first light intensity over a first duration and to provide a second drive current having a second current density of more than about 1.5 A/mm2 to the second light source to generate a second light pulse having a second light intensity that exceeds the first light intensity by at least about 100% over a second duration that is at most about 10% of the first duration, the first light pulse being a visible-spectrum light pulse, the first duration being at least a sensor integration time, the second duration being at most about 5.0 ms;
a camera comprising at least one image sensor having pixels that are sensitive to at least the visible-spectrum light; and
an image processing unit configured to combine information from a visible-spectrum image and a monochrome image to obtain a digital image of a scene.

17. The device of claim 16, wherein the device is a smartphone.

18. The device of claim 16, wherein at least one of the first light source and the second light source comprises one or more light-emitting diodes.

19. The device of claim 16, wherein:
the pixels comprise visible-spectrum pixels that are sensitive to the visible-spectrum light and infrared sensitive pixels that are sensitive to the infrared-spectrum,
the infrared sensitive pixels are about 25% of a total number of pixels in the at least one image sensor, and
the infrared sensitive pixels are distributed between the visible-spectrum pixels.

* * * * *

UNITED STATES PATENT AND TRADEMARK OFFICE
CERTIFICATE OF CORRECTION

PATENT NO. : 11,378,694 B2
APPLICATION NO. : 16/697897
DATED : July 5, 2022
INVENTOR(S) : Van Der Sijde et al.

It is certified that error appears in the above-identified patent and that said Letters Patent is hereby corrected as shown below:

In the Claims

In Column 12, Line 65, in Claim 6, delete "MS;" and insert --ms;-- therefor

Signed and Sealed this
Thirtieth Day of August, 2022

Katherine Kelly Vidal
*Director of the United States Patent and Trademark Office*